(12) United States Patent
Reis et al.

(10) Patent No.: US 7,878,304 B2
(45) Date of Patent: Feb. 1, 2011

(54) GEARBOX ARRANGEMENT FOR A VEHICLE

(75) Inventors: Viktor Reis, Mannheim (DE); Walter Hauck, Neuhofen (DE); Manfred Rimkus, Mannheim (DE); Helmut Schafer, Ketsch (DE)

(73) Assignee: Deere & Company, Moline, IL (US)

( * ) Notice: Subject to any disclaimer, the term of this patent is extended or adjusted under 35 U.S.C. 154(b) by 648 days.

(21) Appl. No.: 10/581,623

(22) PCT Filed: Dec. 15, 2004

(86) PCT No.: PCT/EP0204/053506

§ 371 (c)(1),
(2), (4) Date: Mar. 20, 2007

(87) PCT Pub. No.: WO2005/059409

PCT Pub. Date: Jun. 30, 2005

(65) Prior Publication Data

US 2007/0169583 A1     Jul. 26, 2007

(30) Foreign Application Priority Data

Dec. 17, 2003   (DE) .............................. 103 59 109

(51) Int. Cl.
*F16H 57/02* (2006.01)
*F16H 57/04* (2006.01)
*F16H 61/00* (2006.01)

(52) U.S. Cl. .................... 184/6.12; 184/6.28; 184/11.1; 184/13.1; 475/159; 475/160; 74/15.66; 74/15.8; 74/605; 74/606 R; 180/247; 180/365

(58) Field of Classification Search ................ 184/6.12, 184/13.1, 11.2; 74/606 R, 467; *F16H 057/04*
See application file for complete search history.

(56) References Cited

U.S. PATENT DOCUMENTS

| | | | | | |
|---|---|---|---|---|---|
| 4,915,193 | A | * | 4/1990 | Marquart | 184/6.12 |
| 4,940,394 | A | * | 7/1990 | Gibbons | 417/283 |
| 5,505,112 | A | * | 4/1996 | Gee | 74/606 R |
| 5,669,479 | A | * | 9/1997 | Matsufuji | 192/87.15 |
| 6,299,561 | B1 | * | 10/2001 | Kramer et al. | 475/160 |
| 6,718,847 | B2 | * | 4/2004 | Rimkus et al. | 74/606 R |

* cited by examiner

*Primary Examiner*—Robert A Siconolfi
*Assistant Examiner*—San Aung

(57) ABSTRACT

A gearbox arrangement comprising a main gearbox portion, a first gearbox section, and a second gearbox section. The first gearbox section comprises a differential assembly, wherein the differential assembly comprises a ring gear. The ring gear rotates about an axis. The second gearbox section comprises a power take-off assembly and a bearing plate defined by a plane. The axis and plane are parallel to one another. The gearbox arrangement further comprises a separator mounted to at least one of the first and second gearbox sections. Further, a guide is contained within at least one of the first and second gearbox sections.

12 Claims, 6 Drawing Sheets

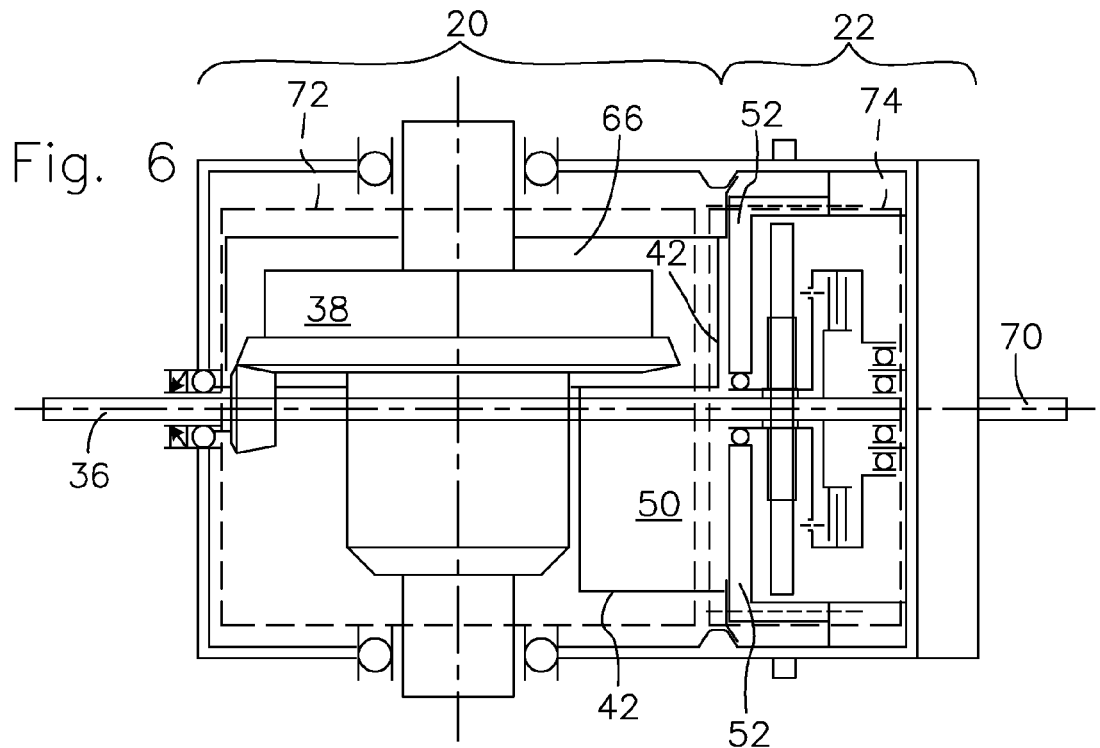
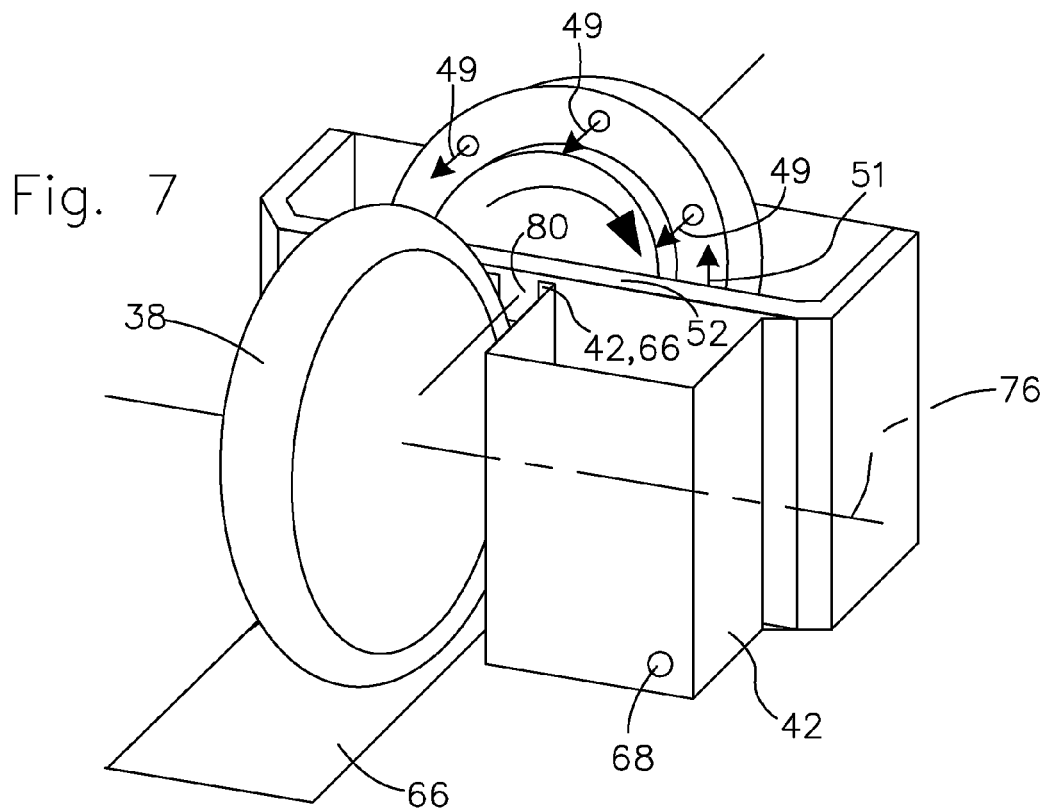

GEARBOX ARRANGEMENT FOR A VEHICLE

FIELD OF THE DISCLOSURE

The present disclosure relates to a gearbox arrangement for a vehicle comprising a separator and a guide to minimize power losses.

BACKGROUND OF THE DISCLOSURE

Gearbox arrangements comprising a separator are known in the state of the art. The applicant's past gearbox arrangements comprise a plurality of gearbox sections. These gearbox sections are adjacent to one another, and they cooperate to form a lubricant sump. The gearbox arrangement further comprises a main gearbox portion, a first gearbox section, and a second gearbox section, wherein the second gearbox section comprises a bearing plate. Still further, the gearbox arrangement comprises a lubricant, such as gear oil.

The gearbox arrangement may further comprise an air pump in communication with the main gearbox portion. When the air pump is operating, it forces the lubricant located in the main gearbox portion into a lubricant channel and, then, into the first and second gearbox sections. This elevates the lubricant in the first and second gearbox sections. This increase in the lubricant elevation increases splashing losses and reduces the gearbox arrangement's efficiency.

Additional parts can be provided to temporarily store the lubricant and, ultimately, counter these problems. (See DE 1,801,917.) However, the prior art's designs require significant, additional installation space. The present disclosure's design does not.

SUMMARY OF THE DISCLOSURE

The present disclosure relates to a gearbox arrangement for a vehicle. The gearbox arrangement comprises a main gearbox portion, a first gearbox section, and a second gearbox section. The gearbox arrangement further comprises a lubricant such as, for example, gear oil. The first and second gearbox sections are adjacent to one another and cooperate to form a lubricant sump. Usually, in a normal operating mode, either one or the other gearbox sections is operating.

Exemplarily, the first gearbox section comprises a differential assembly, wherein the differential assembly comprises a ring gear. The ring gear rotates about an axis. Further, exemplarily, the second gearbox section comprises a power take-off assembly and a bearing plate defined by a plane. The axis and plane are parallel to one another.

The gearbox arrangement may further comprise an air pump in communication with the main gearbox portion. When the air pump is operating, it forces the lubricant located in the main gearbox portion into a lubricant channel and, then, into the first and second gearbox sections. This elevates the lubricant in the first and second gearbox sections. This increase in the lubricant elevation can lead to splashing losses and reduce the gearbox arrangement's efficiency.

The gearbox arrangement comprises a separator mounted to at least one of the first and second gearbox sections. The separator minimizes splashing losses without significantly increasing the gearbox arrangement's size. The first and second gearbox sections are open to one another to allow the lubricant to flow freely between them. If necessary, the separator can be formed higher or lower to provide the necessary lubricant volumes in the first and second gearbox sections.

The separator may comprise one or more shaft seals if necessary. For example, if the upper edge of the separator lies above the gearbox input shaft, there may be a shaft seal between the separator and the gearbox input shaft. Likewise, there may be other shafts traveling through the separator that may also require shaft seals.

The separator may be sealed relative to a gearbox housing with the aid of a housing seal. Exemplarily, the housing seal mates with the gearbox housing and is fastened to the separator. Further, exemplarily, the separator is fastened to the bearing plate, which is part of the second gearbox section. The housing seal may be made of steel strips; rubber; or plastic, for example. The presence of such materials results in loose, manageable production tolerances, which may lower production costs. A non-permeable seal between the first and second gearbox sections is unnecessary. Ultimately, the volume of lubricant seeping, from one section to the other, is negligible relative to the volume the differential and power take-off assemblies feed displace.

A guide may be contained within at least one of the first and second gearbox sections. The guide is used in combination with a rotating gearbox component, such as a ring gear of a differential, to direct the lubricant from one gearbox section to another using the force-off effect of the rotating gearbox component.

A return may be provided to allow the lubricant to flow from one gearbox section to the other gearbox section. The return may be arranged on the separator in the form of, for example, a through-hole or a return channel. In an exemplary embodiment of the gearbox arrangement, the diameter of the through-hole is large enough to provide sufficient flow of the lubricant from the gearbox section with the higher lubricant level to the gearbox section with the lower lubricant level. This ensures that there is a sufficient lubricant in the gearbox section operating at a higher rpm. At the same time, the diameter of the through-hole is small enough to prevent too much return flow. This ensures that splashing losses are minimized.

At high driving speeds, the differential assembly operates at a high rpm. In this case, lubricant is forced from the first gearbox section and into the second gearbox section. At low driving speeds, if the power take-off shaft is activated, the differential assembly operates at a low rpm while the power take-off assembly operates at a high rpm. In this case, the lubricant found in the second gearbox section is forced into the first gearbox section. Under both cases, the return ensures that a predetermined quantity of lubricant can flow from one gearbox section back into the other gearbox section. Also, under both cases, splashing losses are minimized.

If the differential assembly is operating at a high speed and, at the same time, the power take-off assembly is also operating, splashing losses occur. These splashing losses are small, however, relative to the losses in a traditional gearbox arrangement lacking a separator.

The above and other features will become apparent from the following description.

BRIEF DESCRIPTION OF THE DRAWINGS

The detailed description of the drawings refers to the accompanying figures in which:

FIG. 6 is in a top view of the first and second gearbox sections;

FIG. 7 is a perspective view of the first and second gearbox sections; and,

DETAILED DESCRIPTION OF THE DRAWINGS

Figure 1:
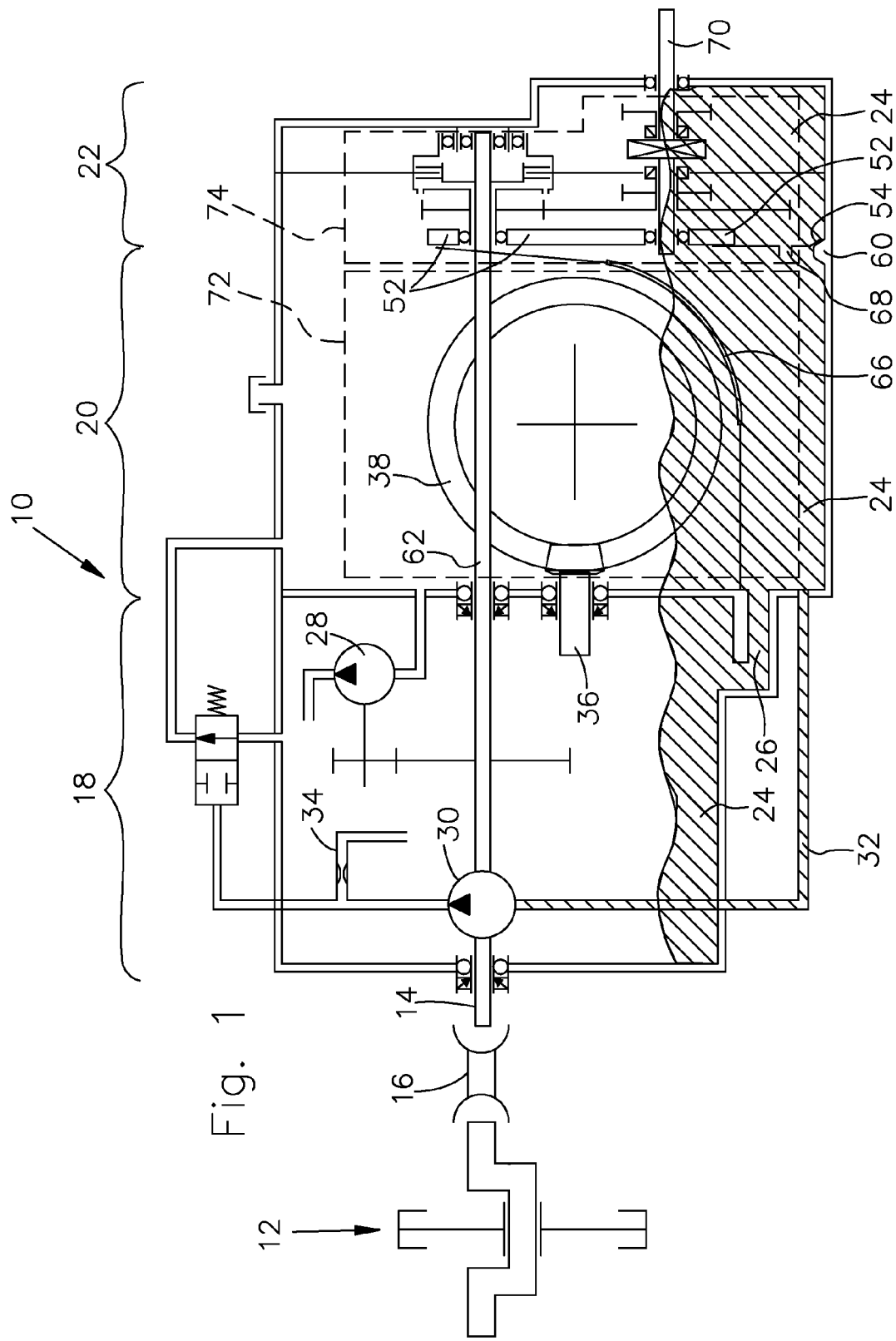
FIG. 1 is a side view of a gearbox arrangement in a first operating state.

Referring to FIG. 1, there is shown a gearbox arrangement 10 of a vehicle in a first operating state. In the first operating state, the internal combustion engine 12 of the vehicle is off. The gearbox arrangement comprises a main gearbox portion 18, a first gearbox section 20, and a second gearbox section 22. The gearbox arrangement 10 is coupled to the internal combustion engine 12 via a cardan shaft 16. The first gearbox section 20 is coupled to the main gearbox portion 18. A first gearbox assembly 72 is arranged within the first gearbox section 20. Exemplarily, the first gearbox assembly 72 is a differential assembly. A second gearbox section 22 is coupled to the housing of the first gearbox section 20. A second gearbox assembly 74 of the vehicle is arranged within the second gearbox section 22. Exemplarily, the second gearbox assembly 74 is a power take-off assembly.

In the main gearbox portion 18 and in the first and second gearbox sections 20, 22, there is a lubricant 24. When the internal combustion engine 12 is off, the lubricant level in the gearbox arrangement 10 is at just one height. The connecting channel 26 connects the main gearbox portion 18 and the first and second gearbox sections 20, 22 in the base of the gearbox arrangement 10.

Additionally, in FIG. 1, a return 68 is shown. Exemplarily, the return 68 is in the form of a bore, in the separator 42. Further, exemplarily, the return 68 has a diameter of 8 mm. At a high driving speed, the lubricant 24 is displaced from the first gearbox section 20 into the second gearbox section 22. The second gearbox assembly 74 comprises a ring gear 38. Thus, the splashing losses of the ring gear 38 are significantly reduced. However, at low driving speeds, the lubricant level is not significantly affected. This is because the low quantity of forced lubricant 24 can flow without trouble from the second gearbox section 22 into the first gearbox section 20. Arrow 69 illustrates this flow (see FIG. 2).

The lubricant level in the first gearbox section 20, which is necessary for maintaining the lubrication and for supplying various pumps, does not fall below a minimum lubricant level. If a severe drop in the lubricant level were to occur, the lubricant supply through the ring gear 38 either ceases to exist or is greatly reduced.

Figure 2:
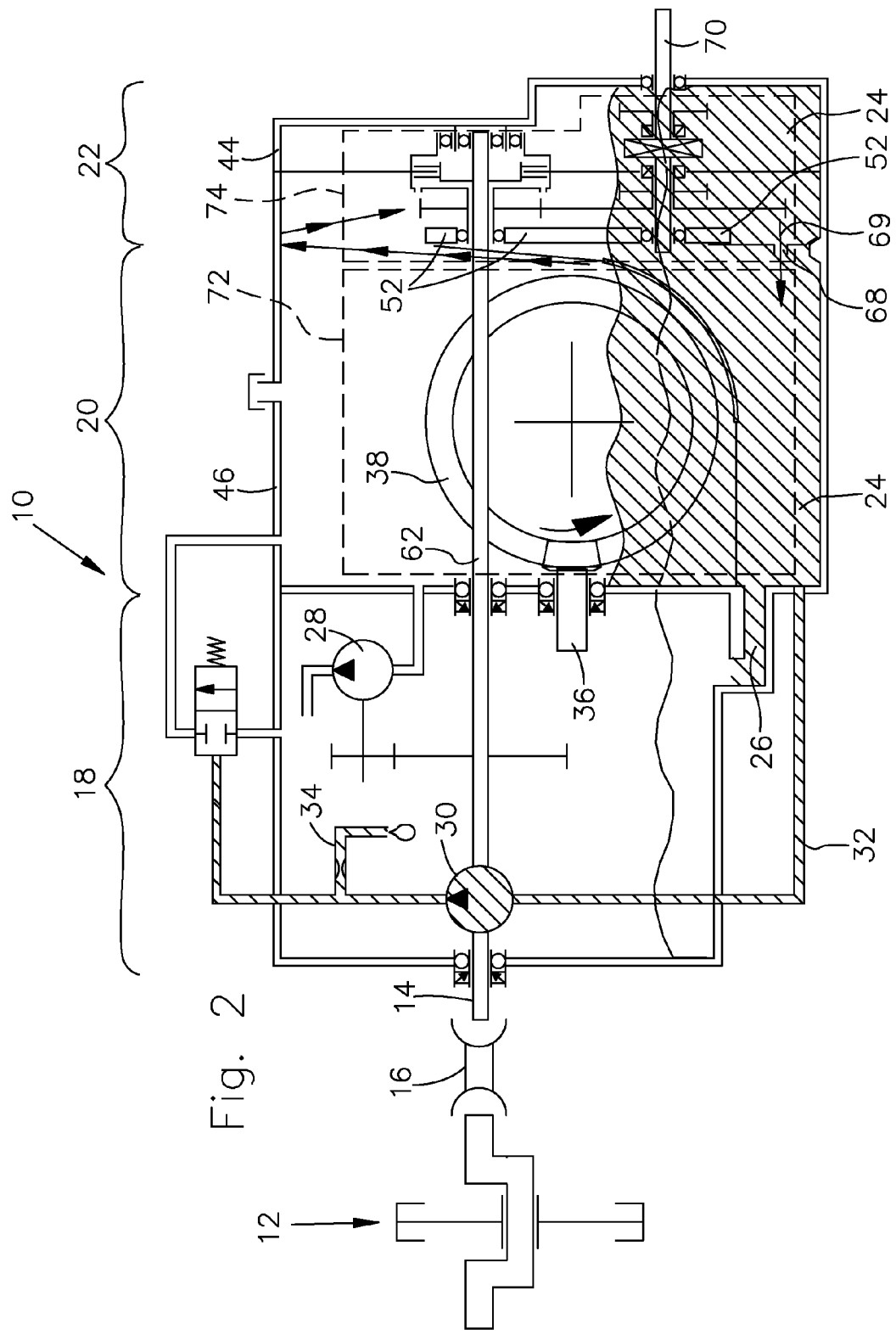
FIG. 2 is a side view of the gearbox arrangement in a second operating state.

Referring to FIG. 2, there is shown the gearbox arrangement 10 in a second operating state. In the second operating state, the internal combustion engine 12 is on. Accordingly, the internal combustion engine 12 rotates the cardan shaft 16, and the cardan shaft 16 rotates the input shaft 14.

An air pump 28 feeds air from the first and second gearbox sections 20, 22 into the main gearbox portion 18. In the main gearbox portion 18, an overpressure is generated, which forces the lubricant 24 through the connecting channel 26 and into the first and second gearbox sections 20, 22. As a result, the lubricant level in the main gearbox portion 18 drops significantly. In contrast, in the first and second gearbox sections 20, 22, the lubricant level rises significantly.

The lubricant pump 30 suctions lubricant 24 via the suction channel 32 and continuously feeds lubricant 24, via the lubricant supply channel 34, to the main gearbox portion 18. As a result, splashing losses are minimal in the main gearbox portion 18.

Figure 3:
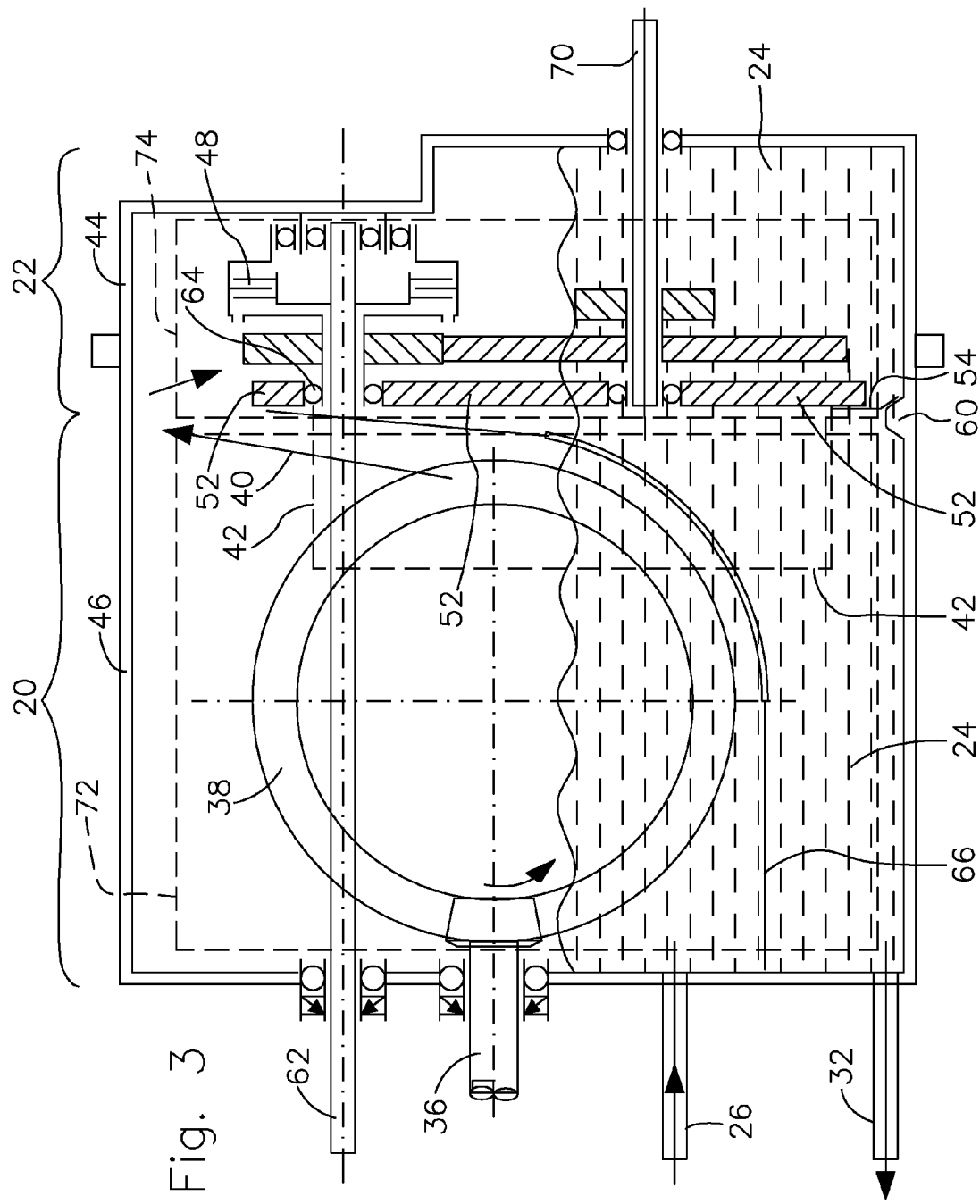
FIG. 3 is an enlarged side view of a first gearbox section and a second gearbox section, wherein the gearbox arrangement is in the second operating state.

Referring to FIG. 3, there is shown an enlarged side view of the first and second gearbox sections 20, 22, in the second operating state. In FIG. 3, the ring gear 38 turns and forces lubricant 24 into the tangential direction diagonally upwards. Arrow 40 indicates this. A guide 66 is also shown. The guide 66 optimizes the feeding effect of ring gear 38.

The separating means 42 extend from the base of the gearbox arrangement 10 to above a drive shaft 62 for the second gearbox assembly 74. Here, the drive shaft 62 for the second gearbox assembly 74 may extend through the separating means 42. A shaft seal (not shown) may be provided.

Figure 4:
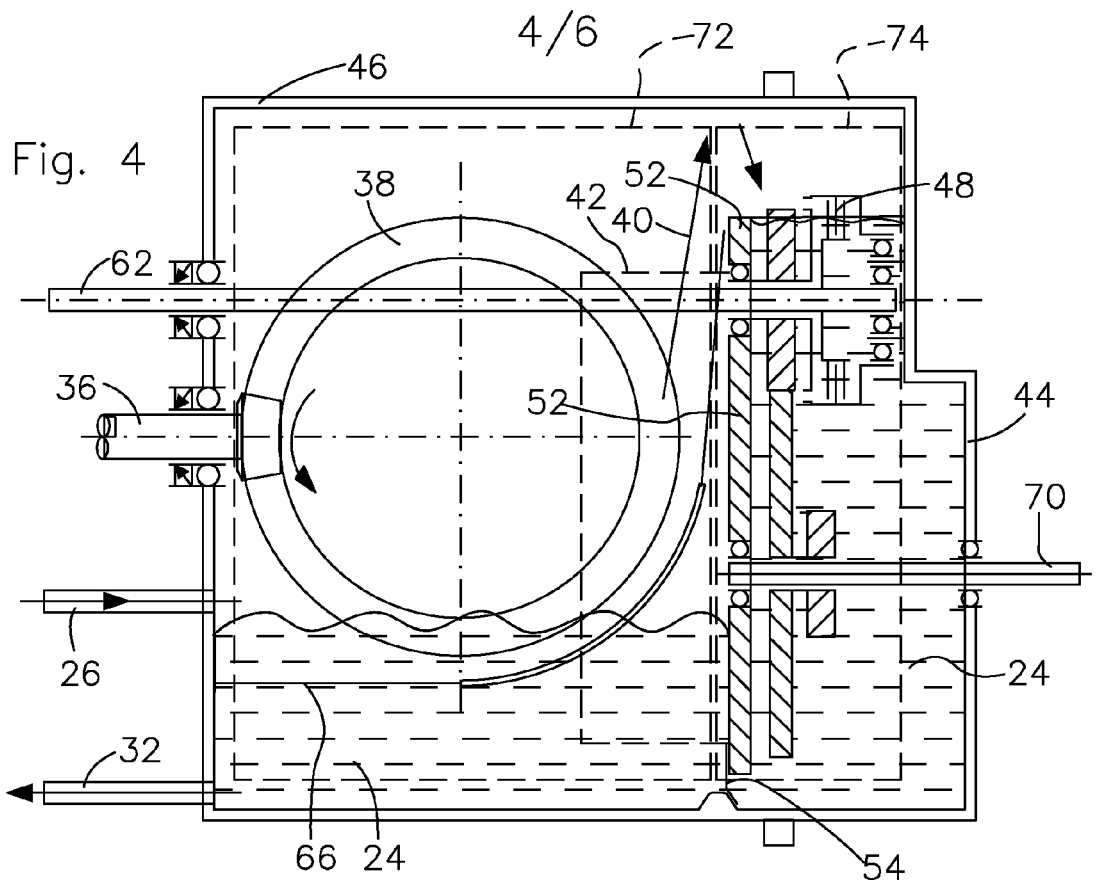
FIG. 4 is a side view of the gearbox arrangement in a third operating state.

Referring to FIG. 4, there is shown a side view of the gearbox arrangement 10 in a third operating state. In the third operating state, the ring gear 38 turns at a high rpm. As a result, the ring gear 38 forces significant amounts of lubricant 24 in the tangential direction diagonally upwards. Arrow 40 indicates this. The lubricant 24 that is forced upwards is reflected off of the upper housing wall 46 and guided into the second gearbox section 22. Thus, splashing losses in the first gearbox section 20 are negligible during this operating state. Further, FIG. 4 shows that the separator 42 partially separates the first and second gearbox sections 20, 22.

Figure 5:
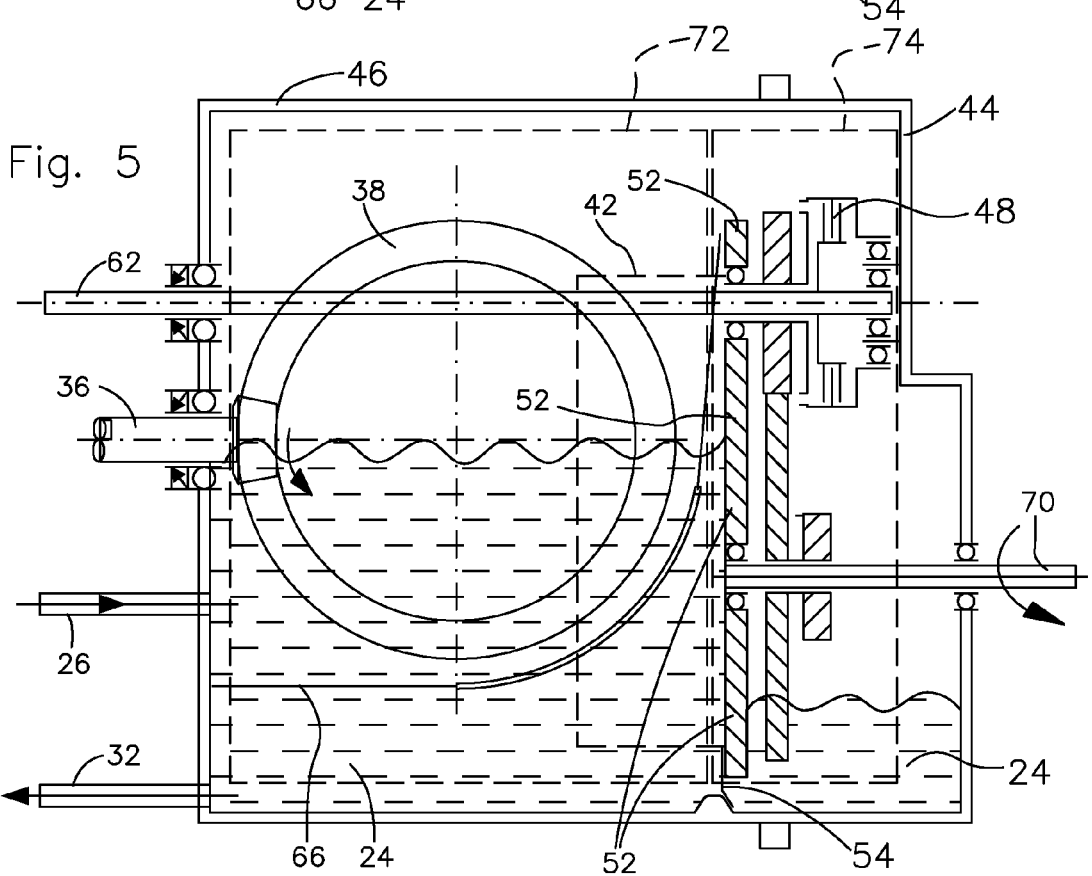
FIG. 5 is a side view of the gearbox arrangement in a fourth operating state.

FIG. 5 is a side view of the gearbox arrangement 10 in a fourth operating state. In the fourth operating state, the ring gear 38 turns at a relatively low rpm, and the second gearbox assembly 74 (i.e., power take-off assembly) turns at a relatively high rpm. The lubricant 24 is forced from the second gearbox section 22 into the first gearbox section 20. In this respect, the splashing losses in this operating state of the vehicle are nearly negligible in the gearbox section 22. Similarly, the splashing losses in the first gearbox section 20 are also relatively low.

Referring to FIG. 6, there is shown a top view of the first and second gearbox sections 20, 22. Reference symbol 50 is present to designate that the separator 42 extends into an area of the first gearbox section 20. The separator 42 increases the volume available for retaining lubricant 24 in the second gearbox section 22.

Referring to FIG. 7, there is shown a perspective view of the first and second gearbox sections 20, 22. The lubricant 24 is guided diagonally in the direction of the gearbox section 20. A lubricant cooling device (not shown) for the power take-off shaft coupling 48 is activated, and the lubricant 24 flowing through the power take-off shaft coupling 48 has a horizontal component in the direction of the gearbox section 20. Arrow 49 indicates this. Further, the lubricant 24 has a vertical component. Arrow 51 indicates this. As a result of the horizontal component, arrow 49, and the vertical component, arrow 51, the lubricant is guided into the first gearbox section 20.

A bearing plate 52, which is produced in the form of a cast part, supports the front bearing positions of the second gearbox assembly 74. The bearing plate 52 is defined by a plane 80. The ring gear 38 is shown rotating about an axis 76. The plane 80 and the axis 76 are perpendicular to one another. Exemplarily, the separator 42 is fastened to the bearing plate 52 with a screw 58 (see FIG. 8).

Figure 8:
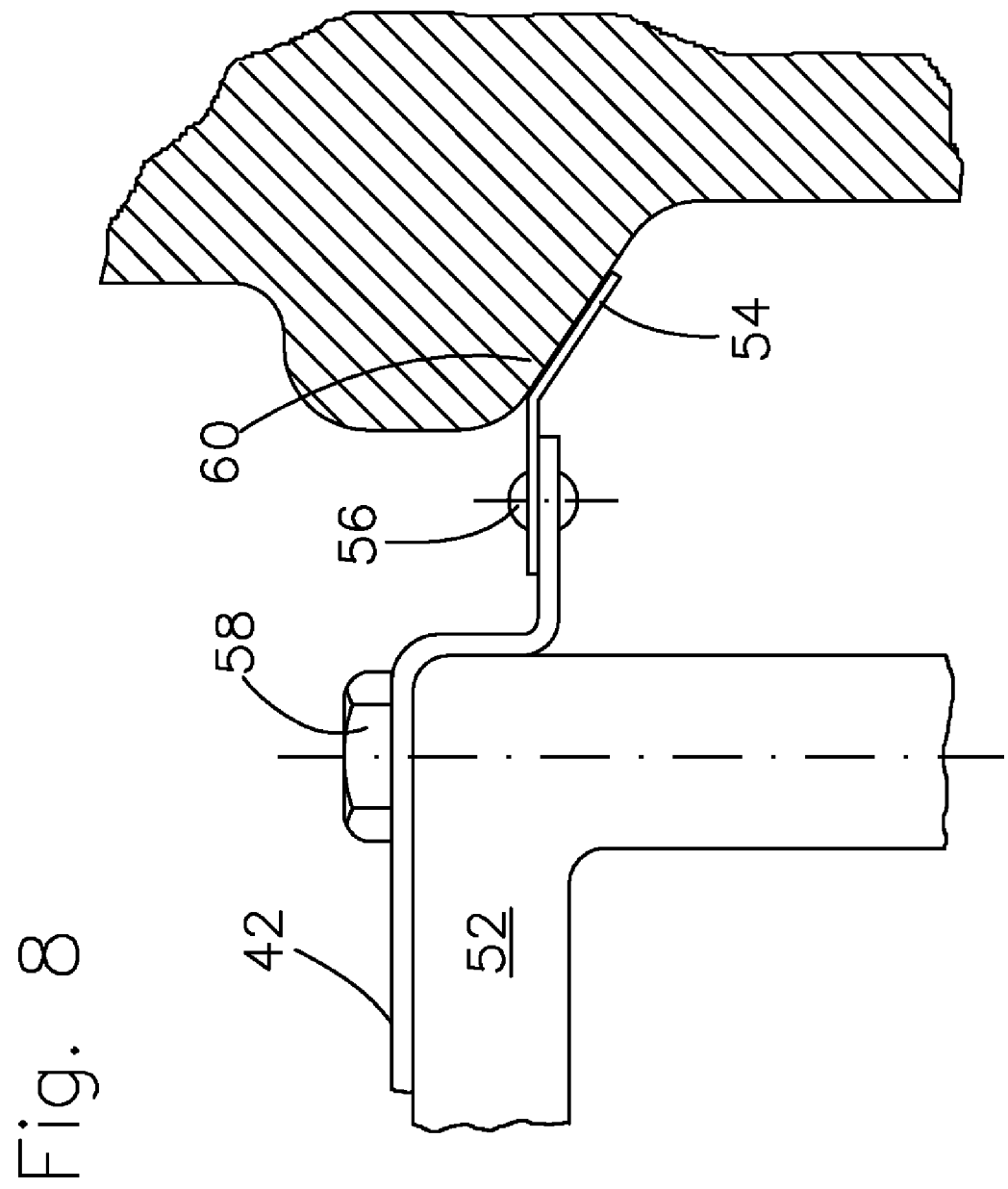
FIG. 8 is a sectional view of a portion of the separator, which shows a housing seal mating with the inner side of the gearbox housing.

Referring to FIG. 8, there is shown a sectional view of a portion of the separator 42. Exemplarily, a housing seal 54 is fastened to the separator 42 with fastener 56. Further, exemplarily, the separator 42 is fastened to the bearing plate 52 with a screw 58. The housing seal 54 may mate with a diagonal a diagonal piece 60 of the gearbox housing.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A gearbox arrangement for a vehicle, comprising:
 a first gearbox section, wherein the first gearbox section comprises a first gearbox assembly;
 a second gearbox section, wherein the second gearbox section comprises a second gearbox assembly and a bearing plate, the second gear box assembly is a power take-off assembly, and the first and second gearbox sections cooperate to form part of a lubricant sump;
 a lubricant encapsulated at least partially in the first and second gearbox sections, wherein more lubricant is retained in one of the first and second gearbox sections that is operating at a lower speed relative to the other of the first and second gearbox sections that is operating at a higher speed; and
 a separator, wherein the separator is mounted to the bearing plate, and the separator extends from the base of the gearbox arrangement up to at least the height of a gearbox input shaft.

2. The gearbox arrangement of claim 1, wherein
 the first gearbox assembly is a differential assembly;
 the differential assembly comprises a ring gear, and the ring gear rotates about an axis;
 the second gearbox section is defined by a plane; and
 the axis and the plane are parallel to one another.

3. The gearbox arrangement of claim 1, wherein the separator comprises a return.

4. The gearbox arrangement of claim 3, wherein the return is in the form of a through-hole.

5. The gearbox arrangement of claim 3, wherein the return is in the form of a return channel.

6. The gearbox arrangement of claim 3, comprising a flexible housing seal, wherein the housing seal is fastened to the separator, and the housing seal mates with the gearbox housing.

7. The gearbox arrangement of claim 6 wherein the flexible housing seal is a steel strip.

8. The gearbox arrangement of claim 6 wherein the flexible housing seal is rubber.

9. The gearbox arrangement of claim 6 wherein the flexible housing seal is plastic.

10. The gearbox arrangement of claim 1, comprising a guide contained within at least one of the first and second gearbox sections.

11. The gearbox arrangement of claim 1, comprising an air pump in communication with the main gearbox portion to force lubricant located in the main gearbox portion into a lubricant channel and into the first and second gearbox sections.

12. The gearbox arrangement of claim 2, comprising
 a separator comprising a return, wherein the separator is mounted to at least one of the first and second gearbox sections, and the separator extends from the base of the gearbox arrangement up to at least the height of a gearbox input shaft,
 a guide contained within at least one of the first and second gearbox sections;
 an air pump in communication with the main gearbox portion to force lubricant located in the main gearbox portion into a lubricant channel and, ultimately, into the first and second gearbox sections; and
 a housing seal, wherein the housing seal is fastened to the separator, and the housing seal mates with the gearbox housing.

* * * * *